June 2, 1953 J. F. BELL ET AL 2,640,919

WAVE SIGNAL FREQUENCY-CHANGING SYSTEM WITH CONSTANT
CURRENT BIASED FREQUENCY CHANGING DEVICE
Filed Dec. 12, 1950

INVENTORS
JOHN F. BELL
ROGER M. NORDBY
BY Francis W. Crotty
THEIR ATTORNEY

Patented June 2, 1953 2,640,919

UNITED STATES PATENT OFFICE 2,640,919

WAVE SIGNAL FREQUENCY-CHANGING SYSTEM WITH CONSTANT CURRENT BIASED FREQUENCY CHANGING DEVICE

John F. Bell, Glenview, and Roger M. Nordby, Skokie, Ill., assignors to Zenith Radio Corporation, a corporation of Illinois Application December 12, 1950, Serial No. 200,457

5 Claims. (Cl. 250—20)

This invention relates to an improved wave-signal frequency-changing system and especially to one which may be employed as a modulator or mixer in a superheterodyne type of receiver to derive an intermodulation product of a pair of signals. The term "wave-signal frequency-changing system" is a generic expression which is used herein to include detectors for demodulating an amplitude-modulated signal as well as frequency-converters or modulators because both modulators and detectors are devices for altering or transposing the frequency of an incoming signal.

One type of modulator previously used as a mixer in a superheterodyne receiver includes a tuned input circuit coupled to a conductive circuit element having a non-linear voltage-current characteristic, such as a germanium crystal diode. A local oscillator is also coupled to the diode and an intermediate-frequency signal is selected therefrom by a tuned output circuit. In order to achieve high conversion efficiency, there is usually applied to the diode a static voltage bias of such magnitude that local oscillator signal excursions traverse the portion of the voltage-current characteristic of greatest curvature. Although generally satisfactory, this arrangement is subject to certain deficiencies which result in variations of modulator performance as will be apparent from the following.

If the voltage bias is fixed at some optimum value for a particular diode element, that value may not be correct for another element. This is understandable since the characteristic curve under consideration is an exponential function and the section of maximum curvature usually occurs at different voltages from one diode to another. Consequently, unless provision is made for adjusting the static bias, operation at the highest efficiency may not be attained and increased input signal excitation may be required if a given output signal intensity is to be maintained.

Moreover, a shift in the operating region effectively results in a shift of average diode impedance. As a result, the loading effect on the input and output circuits of the modulator is not the same for every diode element or every level of local excitation and the overall band width of the modulator may be adversely altered when a germanium diode is replaced or when local excitation is changed.

It is an object of this invention therefore to provide an improved wave-signal frequency-changing system that avoids one or more of the deficiencies of the above-described arrangement.

A further object of the invention is to provide an improved wave-signal frequency-changing system the performance of which remains essentially constant over varied operating conditions.

A wave-signal frequency-changing system, in accordance with the present invention, comprises a two-element predominantly unidirectionally conductive crystal device having a non-linear voltage-current characteristic. The system further includes a source of constant current connected in series with the two-element device for establishing a static current bias therein in order to fix the operating point of the device at a particular part of its afore-mentioned characteristic. The constant current source comprises a source of potential and a series impedance having a value very much greater than the operating impedance exhibited by the crystal device. Means are provided for applying to the two-terminal device a wave signal to be changed in the frequency spectrum and means coupled to the device are provided for deriving therefrom an output signal corresponding to the wave signal, but changed in frequency.

The features of the present invention which are believed to be novel are set forth with particularity in the appended claims. The present invention itself, both as to its organization and manner of operation, together with further objects and advantages thereof may best be understood by reference to the following description taken in connection with the accompanying drawing in which:

Figure 1:
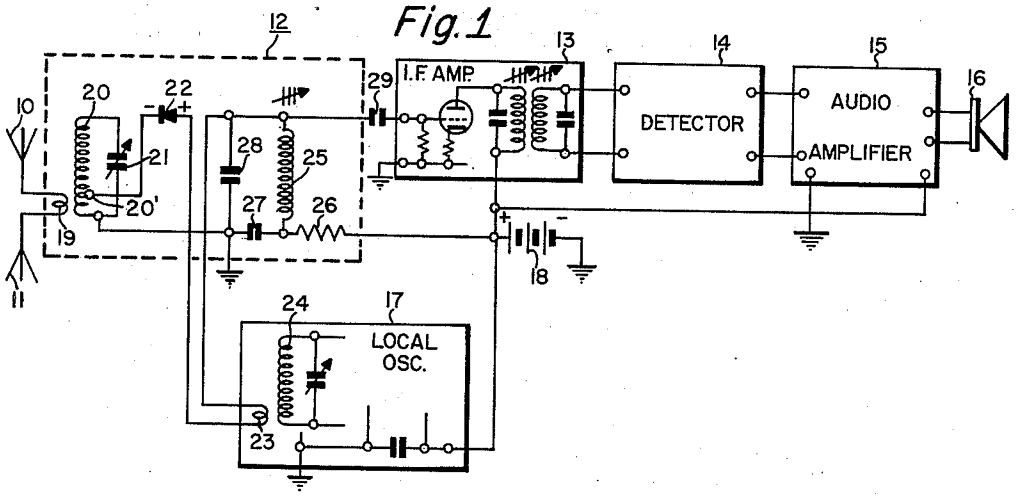
Fig. 1 is a circuit diagram, partly schematic, of a complete superheterodyne receiver including a wave-signal frequency-changing system embodying the present invention.

Referring now to Fig. 1, the superheterodyne receiver there shown comprises, in cascade, an antenna circuit 10, 11, a modulator 12 constructed in accordance with the invention as will be pointed out more fully hereinafter, an intermediate-frequency amplifier 13 which may include one or more stages of amplification, a detector 14, an audio-frequency amplifier 15 of one or more stages, and a sound reproducer 16. A local oscillator 17 is coupled with modulator 12 and derives its excitation potential from a source represented by a battery 18, the negative terminal of which is grounded. This battery is also connected with stages 13 and 15 to supply space current to the electron-discharge devices included in those stages, as exemplified in the drawing by stage 13. One or more stages of radio-frequency amplification may be interposed between antenna 10, 11 and modulator 12 and automatic amplification control may be obtained in well-known manner by a suitable connection from an AVC potential source, which may be included in unit 14, to one or more of the stages of amplifier 13. All of the components of the superheterodyne receiver, with the exception of modulator 12, may be of conventional construction and the general operation of such a receiver is well understood in the art so that a detailed description thereof is unnecessary. In brief, however, a signal is intercepted by antenna circuit 10, 11 and applied to modulator 12 wherein it is heterodyned with the signal from local oscillator 17 and converted into an intermediate-frequency signal. This latter signal is amplified in intermediate-frequency amplifier 13 and is applied to detector 14 wherein the audio-frequency signal components are derived. The audio-frequency signal components, in turn, are applied to audio-frequency amplifier 15 wherein they are amplified and delivered to sound reproducer 16 for reproduction.

Referring now more particularly to the circuit embodying the present invention, wave-signal frequency-changing system 12 includes an input transformer having a primary winding 19 coupled with antenna 10, 11 and a secondary winding 20 connected in parallel with a tuning condenser 21. Coil 20 and condenser 21 constitute a resonant circuit for selecting signals of a given frequency as is well understood in the art. One end of coil 20 is grounded and a tap 20′ near the grounded end is connected to the cathode of a two-element, predominantly unidirectionally conductive frequency-changing device 22 having a non-linear voltage-current characteristic. For purposes of the present discussion, this device may be considered as a germanium crystal diode. Although a germanium diode element is conductive in both directions, its conductivity in one direction is very much greater than in the other and in practical applications, the device is operated to take advantage of the greater conductivity in one direction. Hence, diode 22 is considered predominantly unidirectionally conductive.

The anode of diode 22 is connected to one terminal of a pickup coil 23 inductively coupled to a coil 24 included in the frequency-determining circuit of oscillator 17. The other terminal of pickup coil 23 is connected to one terminal of an intermediate-frequency coil 25 the other terminal of which is connected to the positive terminal of battery 18 through a substantially resistive impedance 26 having a high resistance relative to the impedance of diode 22. The junction of coil 25 and resistor 26 is bypassed to ground by a condenser 27 which has a low impedance for the signal frequencies supplied to and developed in stage 12. A condenser 28 in shunt to coil 25 completes a resonant circuit with coil 25 tuned to the intermediate frequency of the receiver. A ground connection and a connection through a coupling condenser 29 connect stage 12 with stage 13.

The resonant input circuit comprising coil 20 and condenser 21 constitutes means for applying to device 22 an input signal which is to be transposed in the frequency spectrum. In addition, resonant circuit 25, 28 provides means connected to device 22 for deriving therefrom an output signal or intermodulation product corresponding to the input signal supplied through coil 20, but transposed in frequency. For the case under consideration, where device 22 is employed as the mixer or first detector of a superheterodyne receiver, the output signal is the usual intermodulation product produced by the heterodyning action of the mixer in response to the received signal delivered from antenna 10, 11 and the local signal supplied by oscillator 17.

One embodiment of the mixer found to have satisfactory operating characteristics and efficiency employed the following:

| | |
|---|---|
| Element 22 | G-7 or CK710 germanium crystal |
| Resistor 26 | ½ megohm |
| Battery 18 | 200 volts |

The resistance of resistor 26 is very much greater than the impedance of diode 22, so that this resistor and voltage source 18 constitute a source of constant current in series with the diode element to establish a static bias current therein in the direction of greater conductivity in order to fix the operating point of the diode at a particular part of its voltage-current characteristic.

Figure 2:
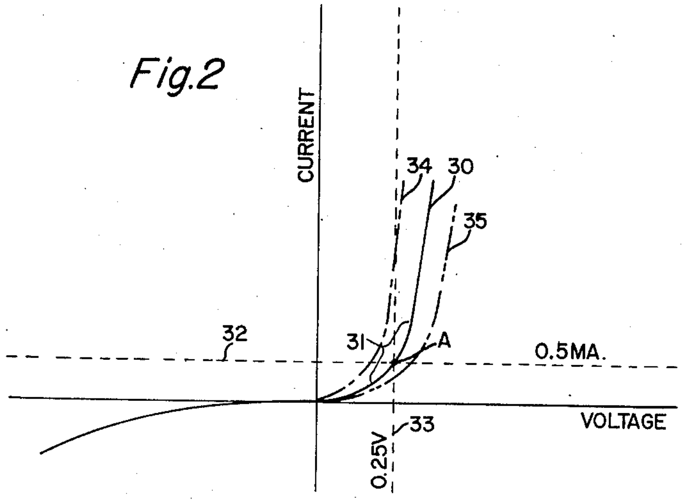
Fig. 2 is a graph representing certain operational characteristics of the circuit of Fig. 1; and, Fig. 3 is a circuit diagram of another embodiment of the invention.

The voltage-current characteristic for the diode is represented by a full line curve 30 of Fig. 2 in which voltage is plotted as the abscissa and current as the ordinate. The bracketed portion 31 of curve 30 exhibits maximum curvature and in order to attain high conversion efficiency for modulator 12 it is desirable that element 22 be operated along this portion 31 of its characteristic curve. With the illustrative values of source 18 and resistor 26 stated above, a bias current of 0.5 milliampere, represented by a horizontal dash line 32, is established in diode 22, and a drop of 0.25 volt, represented by the vertical dash line 33, is developed across the diode.

The intersection A of the bias-current curve 32 with the characteristic 30 denotes the operating point of the diode which, preferably, corresponds to the point of maximum curvature. Commercially available germanium diodes do not all have the identical current-voltage characteristics and it may be assumed that their family of curves fall within the limiting acceptable values represented by curves 34 and 35 in Fig. 2. The static bias-current curve 32 intersects this family of characteristics at points of very nearly the same curvature so that the described arrangement operates satisfactorily and effectively without need for compensating adjustments when the diode is replaced or renewed. This highly desirable practical advantage is not realized in prior arrangements employing a constant voltage as distinguished from a constant current bias. From an inspection of Fig. 2 it is immediately apparent that the line 33 of constant voltage intersects curves 34 and 35 at points of widely different curvature, demonstrating the deficiency of constant voltage bias for the diode.

Another advantage of the frequency changer embodying the present invention is related to adjustment of the local signal intensity supplied thereto. In the modulator shown in Fig. 1 excitation may be easily and conveniently measured by connecting a D. C. voltmeter across diode 22 with no change in operation of stage 12. However, in a mixer utilizing voltage bias, crystal excitation is measured by breaking the crystal circuit and inserting a current measuring device suitably by-passed for radio frequency signals. This procedure is not satisfactory if the stage operates at very high frequencies since the added circuit connections affect operation. Furthermore, since the mixer usually is at the input of a high-gain high-frequency amplifier, regeneration is likely to result from the addition of such connections.

Figure 3:
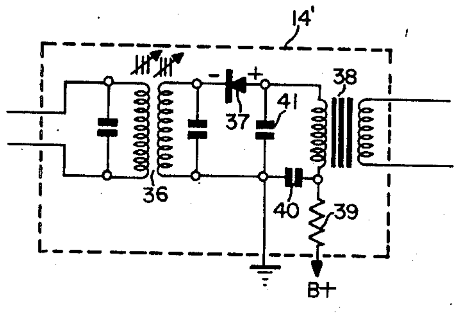

The teachings of the invention are also applicable to a signal detector circuit for demodulating an amplitude-modulated wave as shown in Fig. 3. Incoming intermediate-frequency signals are supplied through a transformer 36 which is double-tuned in conventional fashion. One terminal of the secondary winding of transformer 36 is grounded and the other terminal is connected to the cathode of a germanium crystal diode 37 like element 22 of Fig. 1. The anode of diode 37 is connected to one terminal of the primary winding of an audio-frequency transformer 38, the other terminal of which is connected to the positive terminal of a potential source through a resistor 39. The junction of the primary winding of transformer 38 and resistor 39 is bypassed to ground by a condenser 40 having a low impedance to audio-frequency signals. Another bypass condenser 41 is connected between the anode of diode 37 and ground and has an impedance which is low for intermediate-frequency signals. The secondary winding of transformer 38 serves to couple the detector 14' with an audio amplifier (not shown).

Resistor 39 is chosen so that a constant current of approximately 0.5 milliampere flows through diode 37 to establish operation thereof over a portion of its voltage-current characteristic of greatest curvature. As a consequence, the detector operates with high efficiency and is particularly suitable for use in applications wherein low signal levels are encountered.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. A wave-signal frequency-changing system comprising: a two-element, predominantly unidirectionally conductive crystal device having a non-linear voltage-current characteristic; a source of constant current comprising a source of potential and a series impedance having a value very much greater than the operating impedance exhibited by said crystal device, connected in series with said device for establishing a static bias current therein to fix the operating point of said device at a particular part of its aforesaid characteristic; means for applying to said device a wave signal to be changed in the frequency spectrum; and means connected to said device for deriving therefrom an output signal corresponding to said wave signal, but changed in frequency.

2. A wave-signal frequency-changing system comprising: a two-element, predominantly unidirectionally conductive crystal device having a non-linear voltage-current characteristic, a portion of which is of maximum curvature; a source of constant current comprising a source of potential and a series impedance having a value very much greater than the operating impedance exhibited by said crystal device, connected in series with said device for establishing a static bias current therein to fix the operating point of said device within said portion of its aforesaid characteristic; means for applying to said device a wave signal to be changed in the frequency spectrum; and means connected to said device for deriving therefrom an output signal corresponding to said wave signal, but changed in frequency.

3. A wave-signal frequency-changing system comprising: a two-element, predominantly unidirectionally conductive frequency-changing device of the crystalline type having a non-linear voltage-current characteristic; a source of constant current, comprising a source of potential and a series impedance having a value very much greater than the operating impedance exhibited by said crystal device, connected in series with said device for establishing a static bias current therein in the direction of greater conductivity to fix the operating point of said device at a particular part of its aforesaid characteristic; means for applying to said device a wave signal to be changed in the frequency spectrum; and means connected to said device for deriving therefrom an output signal corresponding to said wave signal, but transposed in frequency.

4. A wave-signal frequency-changing system for a wave-signal receiver including at least one electron-discharge device and a source of space current therefor, comprising: a two-element, predominantly unidirectionally conductive crystal device having a non-linear voltage-current characteristic; an impedance having a value very much greater than the operating impedance exhibited by said crystal device connected in series with said crystal device and said source to constitute a source of constant current for establishing a static bias current in said device to fix the operating point of said device at a particular part of its aforesaid characteristic; means for applying to said device a wave signal to be changed in the frequency spectrum; and means connected to said device for deriving therefrom an output signal corresponding to said wave signal, but changed in frequency.

5. In combination: a two-element, predominantly unidirectionally conductive device of the crystalline type having a non-linear voltage-current characteristic; and a source of constant current, comprising a source of potential and a series impedance having a value very much greater than the operating impedance exhibited by said crystal device, connected in series with said device for establishing a static bias current therein to fix the operating point of said device at a particular part of its aforesaid characteristic.

JOHN F. BELL.
ROGER M. NORDBY.

References Cited in the file of this patent

UNITED STATES PATENTS

| Number | Name | Date |
|---|---|---|
| Re. 18,579 | Ballantine et al. | Aug. 23, 1932 |
| 2,436,830 | Sharpless | Mar. 2, 1948 |